United States Patent [19]
Curran et al.

[11] Patent Number: 5,230,322
[45] Date of Patent: Jul. 27, 1993

[54] METHOD AND APPARATUS FOR COMPENSATING FOR ERRORS ASSOCIATED WITH A FUEL TYPE SENSOR

[75] Inventors: Judith M. Curran, Northville; Raymond L. Willey, Redford; David A. Wright, Brighton, all of Mich.

[73] Assignee: Ford Motor Company, Dearborn, Mich.

[21] Appl. No.: 972,784

[22] Filed: Nov. 6, 1992

[51] Int. Cl.⁵ .......................................... F02M 51/00
[52] U.S. Cl. .................................................. 123/694
[58] Field of Search ........... 123/694, 688, 690, 198 D, 123/1 R, 1 A, 630, 478, 479, 480, 494, 682

[56] References Cited

U.S. PATENT DOCUMENTS

| | | | |
|---|---|---|---|
| 4,391,253 | 7/1983 | Ito | 123/478 |
| 4,438,749 | 3/1984 | Schwippert | 123/494 |
| 4,481,908 | 11/1984 | Iida | 123/119 |
| 4,594,968 | 6/1986 | Degobert et al | 123/119 |
| 4,625,698 | 12/1986 | Jamrog | 123/676 |
| 4,706,629 | 11/1987 | Wineland et al. | 123/678 |
| 4,867,125 | 9/1989 | Grevemayer | 123/694 |
| 4,932,383 | 6/1990 | Zechnall et al. | 123/694 |
| 4,945,863 | 9/1990 | Schmitz et al. | 123/119 |
| 4,945,880 | 8/1990 | Gonze et al. | 123/478 |
| 4,945,881 | 8/1990 | Gonze et al. | 123/486 |
| 4,945,882 | 8/1990 | Brown et al. | 123/676 |
| 4,957,087 | 9/1990 | Ota | 123/79 |
| 4,967,714 | 11/1990 | Inoue | 123/489 |
| 4,982,709 | 1/1991 | Oota | 123/339 |
| 4,986,241 | 1/1991 | Inoue et al. | 123/479 |
| 5,033,438 | 7/1991 | Feldinger et al. | 123/694 |
| 5,065,728 | 11/1991 | Nakinawa | 123/694 |
| 5,140,535 | 8/1992 | Raff et al. | 364/571.07 |
| 5,178,121 | 1/1993 | Kitajuna et al. | 123/689 |

*Primary Examiner*—Raymond A. Nelli
*Attorney, Agent, or Firm*—Allan J. Lippa; Roger L. May

[57] ABSTRACT

An air/fuel control system for use with an internal combustion engine which is adapted to burn fuels having different combustion characteristics. The control system compensates for errors in the fuel-type signal produced by a sensor. A closed-loop air/fuel mixture controller responds to sensed exhaust oxygen levels to maintain combustion near stoichiometry. When the errors from the fuel type sensor predominate, at high engine speed and load, a fuel-type variable, initially obtained from the sensor, is adaptively modified. The error compensation scheme thus adapts to changing fuels, fuel sensor errors, and differing engine operating characteristics to provide better fuel control and improved performance.

4 Claims, 2 Drawing Sheets

METHOD AND APPARATUS FOR COMPENSATING FOR ERRORS ASSOCIATED WITH A FUEL TYPE SENSOR

FIELD OF THE INVENTION

This invention relates generally to electronic control systems for automotive engines and more particularly, although in its broader aspects not exclusively, to an arrangement to compensate for errors associated with a functioning or failed fuel type sensor.

BACKGROUND OF THE INVENTION

Modern automotive engines contain electronic engine control systems which vary operating parameters of the engine, such as air-fuel ratios and ignition timing, to achieve optimum performance. Such control systems are capable of changing engine operating parameters in response to a variety of external conditions.

A primary function of electronic engine control systems is to maintain the ratio of air and fuel at or near stoichiometry. Electronic engine control systems operate in a variety of modes depending on engine conditions, such as starting, rapid acceleration, sudden deceleration, and idle. One mode of operation is known as closed-loop control. Under closed-loop control, the amount of fuel delivered is determined primarily by the concentration of oxygen in the exhaust gas. The concentration of oxygen in the exhaust gas being indicative of the ratio of air and fuel that has been ignited.

The oxygen in the exhaust gas is sensed by a Heated Exhaust Gas Oxygen (HEGO) sensor. The electronic fuel control system adjusts the amount of fuel being delivered in response to the output of the HEGO sensor. A sensor output indicating a rich air/fuel mixture (an air/fuel mixture above stoichiometry) will result in a decrease in the amount of fuel being delivered. A sensor output indicating a lean air/fuel mixture (an air/fuel mixture below stoichiometry) will result in an increase in the amount of fuel being delivered.

Engines which are capable of operating on different fuels, such as gasoline, methanol, a mixture of the two, or natural gas, utilize electronic engine control systems to change the engine operating parameters in response to the type of fuel being delivered to the engine. Such systems utilize a sensor to detect the type of fuel being delivered to the engine and an electronic engine control to vary the operating parameters accordingly. An instance of such a system is disclosed in Wineland et al. in U.S. Pat. No. 4,706,629.

Unfortunately, it is possible for the sensor to indicate erroneous mixture values under certain operating conditions. For example, in the instance of liquid fuels, if the fuel is 100% gasoline, but of a different composition than that used to "calibrate" the sensor, the sensor might indicate that the fuel is a mixture of gasoline and methanol rather than 100% gasoline. Since different mixtures of gasoline and methanol all have different burn rates and stoichiometric air/fuel values, errors in sensing the mixture can produce poor driveability, bad air/fuel control, and excessive exhaust emissions.

A similar problem occurs with engines that use natural gas as a fuel. Natural gas is an unregulated fuel which consists mostly of methane with varying amounts of ethane, propane, butane, and other inert gases. Each of these gases are characterized by different combustion properties, and consequently, the air/fuel ratio and ignition timing requirements differ with the gas composition. As with liquid fuels, errors in sensing the mixture can produce poor driveability, bad air/fuel control, and excessive exhaust emissions.

In the event that the flexible fuel sensor fails, the operating parameters which are dependent on the output of the fuel type sensor will be erroneous. Unlike systems which operate with a single type of fuel, an engine capable of, and actually operating on different fuels cannot revert to a preset value if the fuel sensor fails. As a result, the electronic fuel control system will continually vary the operating parameters to adjust for a detected fuel which is erroneous. Such a condition will at best lead to poor driveability, bad air/fuel control, and excessive exhaust emissions, and at worst can lead to complete failure of the engine.

SUMMARY OF THE INVENTION

The preferred embodiment of the invention compensates for inaccuracies in a fuel-type sensor, thereby improving the dynamic response and static performance of an internal combustion engine and obtaining higher catalyst conversion efficiencies, lower tail pipe emissions, and increased engine efficiency.

The arrangement contemplated by the present invention operates in conjunction with a closed-loop air/fuel mixture control system in which the oxygen level in the combustion products exhausted by the engine is monitored to vary the air/fuel mixture supplied to the engine, thereby maintaining the mixture near stoichiometry. In order to adapt to varying operating conditions, the closed-loop air/fuel mixture control system stores an array of control values which are adaptively varied whenever the closed-loop system fails to maintain the exhaust oxygen level within prescribed limits. These control values are advantageously stored in a lookup table which is indexed by values indicating engine speed and load (air charge). If the closed-loop system is unable to control the air/fuel ratio at or near stoichiometry for a given engine speed and load, a control value indexed by that given speed and load is incremented or decremented until stoichiometry is achieved, and the new "learned" control value is then retained in the lookup table (implemented with a non-volatile memory so that the stored table values are not lost when the vehicle's ignition key is turned off).

In accordance with the invention, at least one of these stored control values is monitored to insure that it stays within a predetermined range of acceptable values. If the monitored value departs from that range, it is assumed that the departure is due to a faulty fuel-type sensor. In that event, further efforts to vary the control value in the table is temporarily discontinued. Instead, another control value which modifies the fuel-type signal from the sensor is altered to drive the air/fuel mixture toward stoichiometry. In this way, the system according to the invention compensates for fuel-type sensor errors by an independent adaptive mechanism which allows the normal fuel control adaptive variables in the lookup table to remain at more nearly normal levels.

In accordance with an important aspect of the present invention, the adaptive fuel control value that is monitored is indexed by a selected high rpm, high load engine operating condition. In this way, other engine malfunctions, which might be erroneously interpreted as a fuel-type sensor error, produce effects which have relatively low magnitudes compared to the effects of a fuel-type sensor failure. In this way, the adaptive fuel control lookup table mechanism is made to perform the function of a selective filter which isolates fuel-type sensor errors from other errors which might otherwise lead to counterproductive adaptive corrections.

These and other features and advantages of the present invention will become more apparent through a consideration of the following detailed description of a preferred embodiment of the invention.

DETAILED DESCRIPTION

Figure 1:
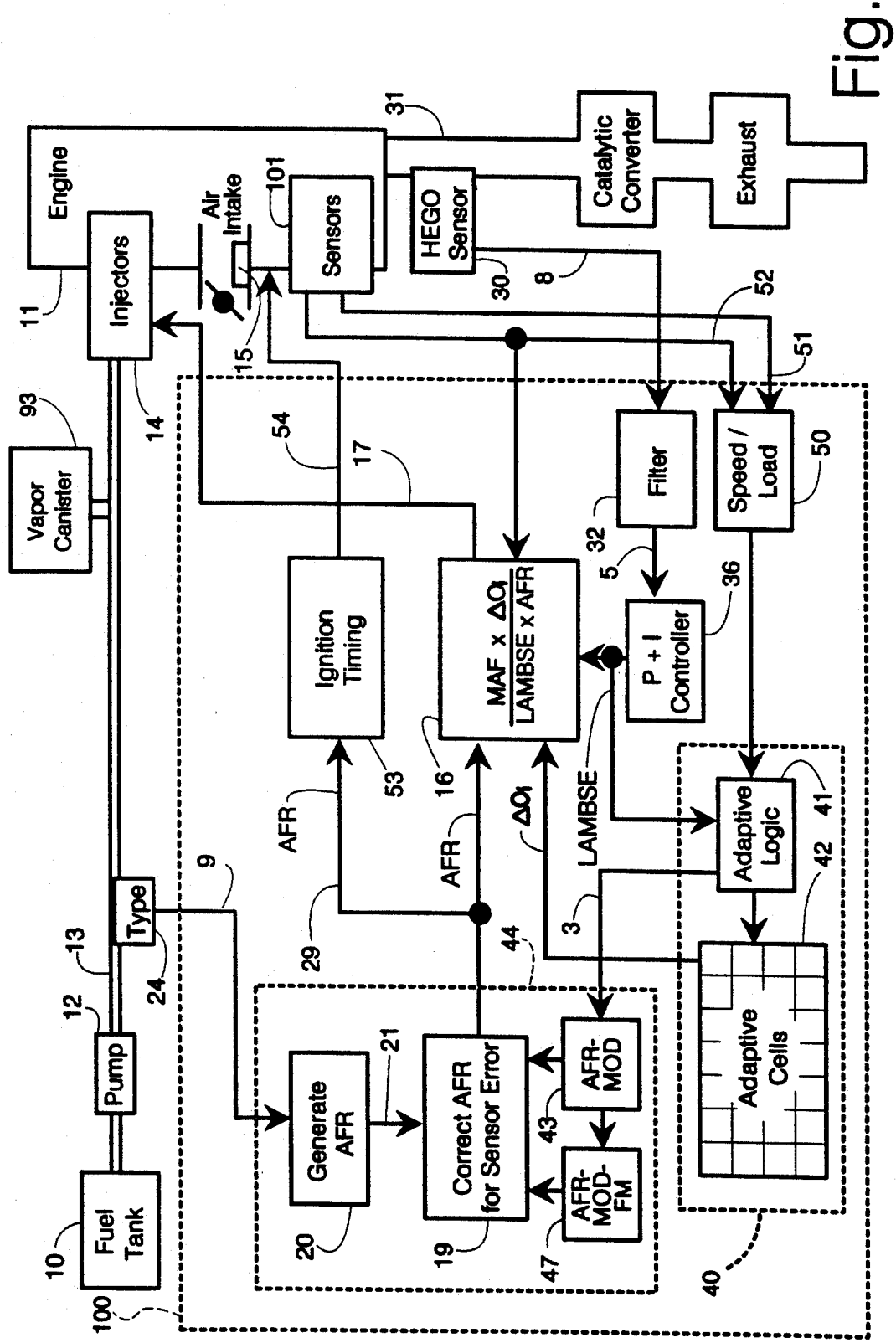
FIG. 1 is a schematic block diagram of an automotive fuel delivery system and electronic engine control system which embodies the invention.

FIG. 1 of the drawings shows a system which embodies the principles of the invention. A fuel pump 12 pumps fuel from a fuel tank 10 through a fuel line 13 to a set of fuel injectors 14 which inject fuel into an internal combustion engine 11. The fuel injectors 14 are of conventional design and are positioned to inject fuel into their associated cylinder in precise quantities. The fuel tank 10 advantageously contains liquid fuels such as, gasoline, methanol, or a combination of fuel types.

A fuel-type sensor 24, positioned along the fuel line 13, optically detects the type of fuel being pumped to the fuel injectors 14 by measuring the refractive index of the fuel and transmits the resulting fuel-type signal 9 to an electronic engine controller (EEC) which implements the functions shown, in block diagram form, within the dashed line 100 in FIG. 1.

The EEC functions 100 are preferably implemented by one or more microcontrollers, each is comprised of one or more integrated circuits providing a processor, a read-only memory (ROM) which stores the programs executed by the processor and configuration data, peripheral data handling circuits, and a random access read/write scratchpad memory for storing dynamically changing data. These microcontrollers typically include built-in analog-to-digital conversion capabilities useful for translating analog signals from sensors and the like into digitally expressed values, as well as timer/counters for generating timed interrupts. Such microcontrollers are available from a variety of sources and include the Motorola 6800 family of devices which are described in detail in *Motorola's Microprocessor and Microcontroller Families.* Volume 1 (1988), published by Motorola, Inc., Microcontroller Division, Oak Hill, Tex.

The analog-to-digital converters (not shown) convert sensor signals, such as the fuel-type signal 9, into digital form for storage in the RAM memory. A mass air flow detector 15 positioned at the air intake of engine 11 detect the amount of air being supplied to cylinders for combustion. A heated exhaust gas oxygen (HEGO) sensor 30, positioned on the exhaust system 31 of the engine 11, detects the oxygen content of the exhaust gas generated by the engine 11, and transmits a representative signal 8 to the EEC 100. Still other sensors, indicated generally at 101, provide additional information about engine performance to the EEC 100, such as crankshaft position and speed, throttle position, etc., from which provide information on engine operating conditions which is used by the EEC 100 to control engine operation. As indicated at 20, The fuel-type signal 9 is used in this way to produce a desired air/fuel ratio (AFR) value 21 which corresponds to the type of fuel detected by the fuel-type sensor 24.

The memory within the EEC stores the fuel-type values which are supplied by the fuel-type sensor 24. Power to the writable memory which stores these fuel-type values is maintained even when the engine is turned off so as to maintain the information stored in the memory. Termed a "Keep Alive Memory" (KAM), this section of the memory is continuously powered by the vehicle battery, even when the ignition key is turned off, and advantageously allows values which describe past engine performance to be "learned" and then used later to better control the subsequent operation of the engine. The air/fuel ratio module 20 delivers the AFR signal 21 to the fuel-type sensor correction module 19 which corrects the air/fuel ratio for sensor error in the manner to be described.

A microcontroller within the EEC 100 further implements a Proportional+Integral (PI) controller seen at 36 which responds to the HEGO signal 8 to control the amount of fuel delivered by the injectors 14 by supplying a fuel rate control signal called LAMBSE to a further control module 16 which, in turn, supplies the fuel delivery rate control signal 17 to the injectors 14.

The input of to the PI controller 36 is supplied via a HEGO signal filter 32 which filters the HEGO signal value 8 to eliminate high frequency noise. Concurrently, the output of the PI controller 36 is applied to an adaptive logic module 41 which also receives data concerning engine speed and load (aircharge normalized to sea level) from a module 50 which processes sensor signals 51 and 52 from the engine sensors 101. The speed/load module 50 processes the signals on sensor lines 51 and 52 and transmits speed and load indicating values to the adaptive logic block 41.

The PI controller 36 determines, according to the filtered HEGO signal 5, whether the fuel delivery rate at the injectors 14 is to be increased or decreased, depending upon whether the HEGO sensor 30 indicates an oxygen level above or below stoichiometry, respectively. The PI controller 36 may take the form described by Zechnall, et al. in SAE Paper No. 730566, or by D. R. Hamburg and M. A. Schulman in SAE Paper 800826.

Figure 2:
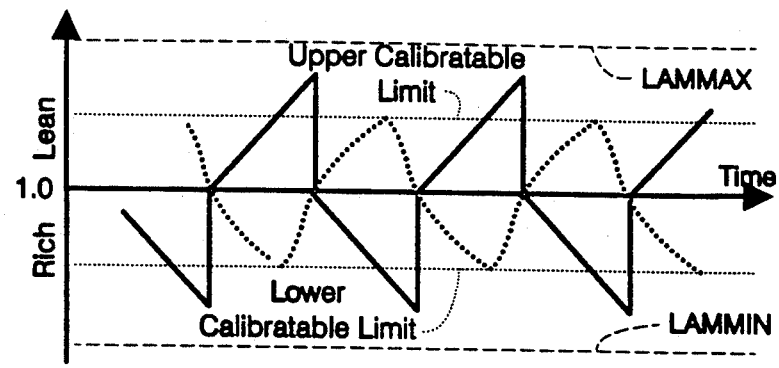
FIG. 2 depicts the output of a proportional+integral controller for determining an output for a set of injectors based on a heated exhaust gas oxygen sensor.

The graph in FIG. 2 shows the operation of a typical PI controller 36. The solid waveshape illustrates the fuel-rate signal applied to the fuel injectors in response the oxygen level in the combustion products as detected and measured by an exhaust sensor. The dashed line in FIG. 2 illustrates the variation in exhaust gas oxygen level at the sensor. Increasingly lean air/fuel ratios are represented by positive-going increases of the dotted line, while increasingly rich air/fuel ratios are represented by negative going increases of the dotted line. The lean and rich indications along the vertical axis in FIG. 2 indicate the direction of the solid line. Positive-going increases on the graph thus indicate instances where the PI controller 36 is commanding a leaner air/fuel ratio, while negative-going increases indicate instances where the PI controller 36 is commanding a richer air/fuel ratio.

As illustrated in FIG. 2, the fuel rate control system increases the amount of fuel injected whenever the exhaust oxygen sensor detects an oxygen level greater than stoichiometry, and decreases the amount of fuel injected whenever the exhaust gas sensor indicates that fuel in excess of stoichiometry has been injected. The PI controller 36 implements the control function by responding to the HEGO exhaust gas sensor 30 which operates as a simple switch, delivering either a positive or negative input signal to a simple integrator, depending on whether the exhaust gases are rich or lean. The integrator in turn generates a sawtooth ramp-waveshape which is combined with a component proportional to the square-wave HEGO signal, to produce the composite control signal, called "LAMBSE", indicated in FIG. 1. The LAMBSE signal is then used by the injection control signal generator module 16 to calculate the fuel delivery rate control signal based on the relation:

$$\text{Fuel Delivery Rate} = \frac{MAF \times \delta O_i}{LAMBSE \times AFR}$$

where MAF is the mass airflow rate per cylinder, AFR is the air/fuel ratio from module 44 (corrected for sensor error in the manner to be described), LAMBSE is the control signal developed from the HEGO sensor by the PI controller 36, and $\sigma O_i$ is an error signal developed by the adaptive controller unit 40 to be described. The dashed horizontal lines, designated LAMMAX and LAMMIN, in FIG. 2 represent allowable maximum (LAMMAX) and minimum (LAMMIN) limits for PI controller output signal LAMBSE. The dashed horizontal lines, designated as upper and lower calibratable limit, represent a calibratable range for LAMBSE.

The air/fuel ratio correction module 44 seen in FIG. 1 operates in conjunction with the adaptive learning module 40 to correct for errors in the fuel-type signal 9. As seen at the block 20 in FIG. 1, the air/fuel ratio correction module 44 first obtains an uncorrected air/fuel ratio from a lookup table stored in read-only memory based on the value of fuel-type signal 9, whose magnitude indicates the refractive index of the fuel. The conversion of the fuel-type signal 9 to the uncorrected air/fuel ratio value advantageously limits that value to a minimum of 6 and a maximum of 15. The uncorrected AFR value 21 from the lookup table is then corrected at block 19 to create the value AFR in accordance with the relationship:

$$AFR = AFR_{uncorrected} \times (1 + AFRMOD)$$

where AFR_MOD is a correction value stored in a register 43.

The corrected air/fuel ratio value AFR generated by the air/fuel ratio correction module 46 is supplied to the ignition timing block 53 to vary the time position of the ignition timing signal 54 supplied to the engine 11, and is also supplied to the injector control signal generator 16 which varies the magnitude of the injector control signal 17 supplied to the injectors 14 to control the rate at which fuel is delivered to the engine.

The adaptive learning module, shown generally within the dashed rectangle 40 as shown in FIG. 1, comprises an adaptive logic unit 41 and an adaptive fuel table 42. The adaptive fuel table 42 is a lookup table in memory comprising a two-dimensional array of learned fuel system correction values, each cell being addressed by a first and second values indicating engine speed and load respectively as supplied by the speed/load unit 50 seen in FIG. 1. The table 42 advantageously contains eight rows (indexed by normalized load value) by ten columns (indexed by normalized engine speed values), or 80 cells, plus either four or six special idle adaptive cells, resulting in 86 total cells. The value in each cell may range from 0 to 1. Ideally, if LAMBSE = 1.0 and data from a mature adaptive fuel table 42 is used, a stoichiometric air/fuel ratio will result at any speed-load point where adaptive learning has taken place.

The adaptive logic unit 41 controls the functions of the adaptive learning module 40. The cell value that is read from table 42 varies between 0.0 and 1.0 and is increased, by the adaptive logic unit 41, by the offset value 0.5 to generate the fuel correction factor $\sigma O_i$ supplied to the fuel injector control signal generator 16. Thus the fuel correction factor $\sigma O_i$ will range advantageously from 0.5 to 1.5.

The adaptive learning module 40 operates under the control of the adaptive logic unit 41 to implement an adaptive learning strategy which enhances the performance of the engine. Fuel injected systems may exhibit vehicle to vehicle steady state air/fuel ratio errors due to normal variability in fuel system components. The adaptive learning module alleviates this problem by memorizing the characteristics of the individual fuel system being used. This memorized information is used to predict what the system will do based on past experience. The ability to predict fuel system behavior improves both open loop and closed loop fuel control. As an example, the memorized information can be used on cold starts to achieve better open loop fuel control before the HEGO sensor reaches operating temperature. The chief benefit of the adaptive fuel strategy however, is to reduce the effects of product variability in the field.

The adaptive learning module 40 operates as follows: The output of the PI controller 36 (LAMBSE) is checked against the upper and lower calibratable limits. The adaptive learning module 40 will determine LAMBSE to be outside of the calibratable range if LAMBSE is greater than the upper calibratable limit or less than the lower calibratable limit. This limit is specific to each type of engine in which the control system is installed and is typically about 1%. Thus, if LAMBSE exceeds the limit by more than 1%, the cell in the adaptive table 42 corresponding to the speed and load at which the engine is currently operating is decremented. If LAMBSE is below the limit by more than 1%, the cell in the adaptive table 42 corresponding to the speed and load at which the engine is currently operating is incremented to increase fuel delivery at that load and speed. Thus, each cell value is able to reflect an ongoing learned value representing the particularities of the specific engine in which the table 42 is installed.

Under high speed and high load conditions, the errors from the other sensors 101 may be expected to be small in comparison to errors caused by a faulty fuel-type sensor 24. Thus, at high speed and load, it may be safely assumed that any significant difference between the air/fuel ratio generated at 21 based on the detected fuel-type indicated by sensor 24, and the amount of fuel actually required to effect a switch in the HEGO sensor 30, is attributable largely to errors originating in the fuel-type sensor 24, which can be as high as 25%.

In accordance with the invention, a high speed/load region of operation of the engine 11 may be advantageously selected as being a "high confidence region" and, the engine is operating in this high confidence region, the value AFR_MOD held in register 43 is varied as a function of LAMBSE to "learn" the errors in the fuel-type signal 9. This novel feature enhances combustion efficiency by more accurately compensating for inaccuracies in the output of the fuel-type sensor. When the engine 11 is operating at high speed and load the error from the other sensors 101 is minimal and any variation of HEGO from normal limits may be more confidently attributed to errors in the fuel-type sensor. Under these conditions, the register AFR_MOD 43 is altered as a function of LAMBSE, which is generated as a function of the output of the HEGO sensor 30. The output of the HEGO sensor 30 will be representative of the accuracy of the air/fuel ratio 21. The invention thus contemplates learning the inaccuracies in the fuel-type sensor at high speed and loads to more accurately compensate for the inaccuracies in the fuel-type sensor.

Figure 3:
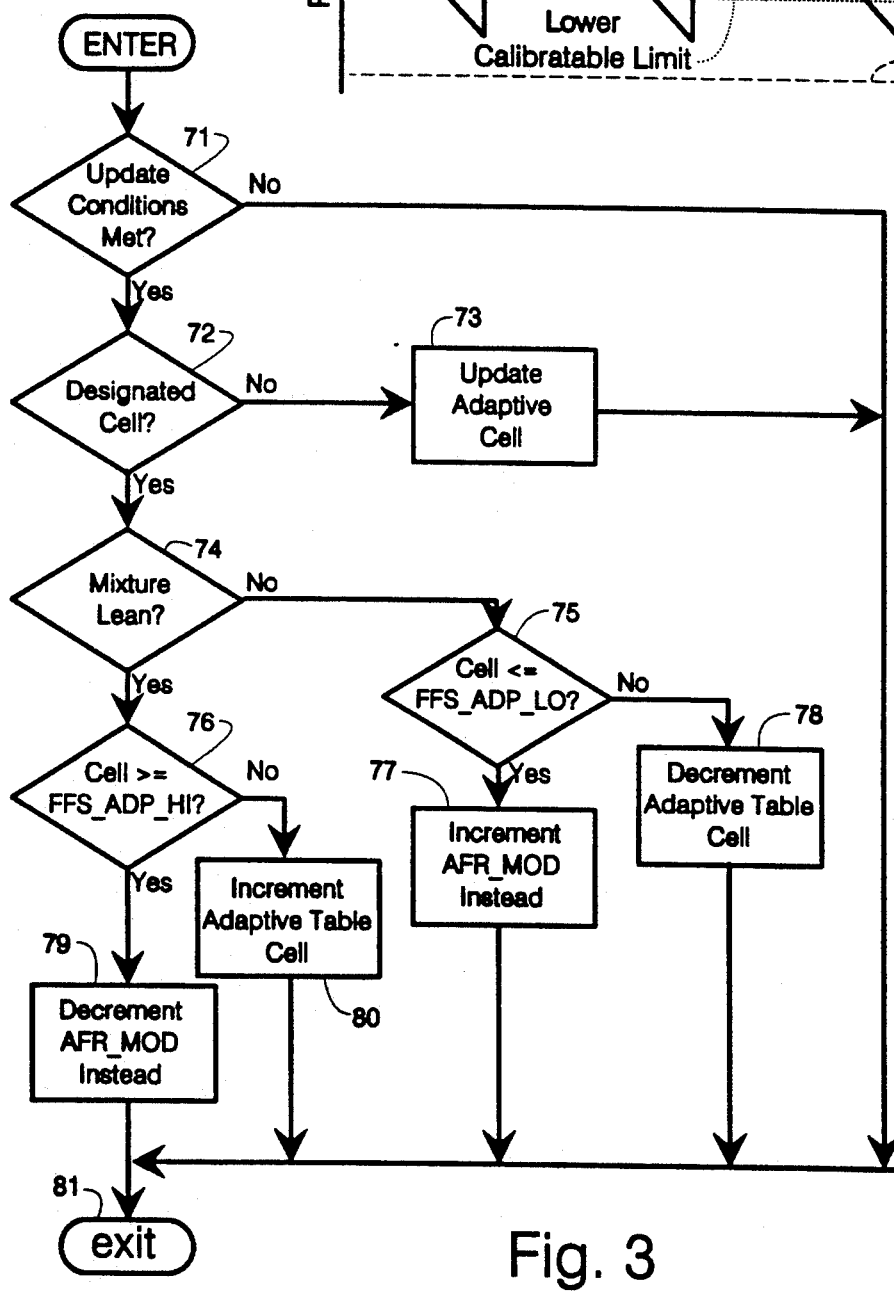
FIG. 3 is a flowchart depicting the operation of a preferred embodiment of the invention.

The flowchart shown in FIG. 3 depicts the operation of the control system under conditions when the fuel-type sensor 24 is operating. First, as shown at 71 in FIG. 3, certain conditions are checked to determine if the adaptive fuel table is to be updated. The adaptive fuel table 42 will be updated if the engine has reached a certain steady state operating temperature, is not operating under highly transient throttle positions, and is under closed loop control.

If conditions to update the adaptive fuel table have been met, then, as shown at 72, a check is made to determine if the cell to be updated is the designated flexible fuel sensor (FFS) cell. This is done by checking to see if the engine is operating under the defined high speed/load conditions. If the engine is not operating at the defined high speed/load condition, then normal adaptive learning, as described above, is performed as indicated at 73.

If the cell to be updated is the high speed/load cell then, as shown at 74, a check is performed to determine whether the current fuel mixture is rich or lean. Step is performed by checking whether LAMBSE is being ramped in either the rich or lean direction. LAMBSE being ramped rich indicates that an lean condition has been detected by the HEGO sensor 30, and thus the high speed/load cell is designated to be decremented. LAMBSE being ramped lean indicates that a rich condition has been detected by the HEGO sensor 30, and thus the high speed/load cell is designated to be incremented.

If the high speed/load cell is to be incremented, then, as shown at 76, the cell is compared to determine if the value contained within it is greater than a predetermined maximum value FFS_ADP_HI for the cell. If the designated cell value is greater than or equal to FFS_ADP_HI, then, as shown at 79, AFR_MOD is decremented and the value in the designated cell in table 42 is maintained. If the value is less than FFS_ADP_HI then, as shown at 80, AFR_MOD is left unchanged and the value in the designated cell of table 42 is incremented.

If the air/fuel mixture detected by the HEGO sensor is lean as determined at 74, the designated cell value is compared against the lowest value allowed FFS_ADP_LO. If the cell is less than or equal to FFS_ADP_LO, then AFR_MOD is incremented and the high speed/load cell is maintained as seen at 77. Otherwise, as shown at 78, the designated high speed/load cell is decremented and AFR_MOD is maintained.

After AFR_MOD or the adaptive table 42 have been updated, the air/fuel ratio is adjusted by the computation at 16, which processes the AFR value corrected at 19 using the current AFR_MOD value which compensates for errors in the fuel-type sensor 24.

The corrected AFR value is also supplied to the ignition timing unit. In this way, the system better adapts to the varying ignition timing characteristics needed to advance or retard ignition to provide anti-knock control responsive to varying fuel octane characteristics.

In accordance with another feature of the invention, the adaptive AFR_MOD value advantageously adjusts the long-term values contained throughout the adaptive table 42. For instance, as the fuel-type sensor 24 ages and the inaccuracies in the type of fuel detected become centered around a certain new point, the adaptive AFR_MOD value effects the actual air/fuel mixture such that adaptive table 42 modifies its contents to accommodate for the long term change in the corrected fuel-type value AFR.

It is to be understood that the specific embodiment which has been described is illustrative of only one application of the principles of the invention. Numerous modifications may be made to the specific methods and apparatus disclosed without departing from the true spirit and scope of the invention.

What is claimed is:

1. An air/fuel control system for an internal combustion engine which comprises, in combination,
    a sensor for detecting the level of oxygen in the combustion products exhausted by said engine,
    means for producing an oxygen-level control signal which progressively varies in one direction when said sensor indicates a low oxygen level and which progressively varies in the opposite direction when said sensor indicates a high oxygen level,
    means for storing a corrected fuel-type value indicative of the combustion characteristics of the fuel being supplied to said engine,
    means for storing an adaptive control
    control means jointly responsive to said oxygen-level control signal, said fuel-type value and said adaptive control variable for adjusting the air/fuel ratio of the fuel mixture supplied to said engine,
    means responsive to deviations in said oxygen-level beyond a predetermined first range of values for modifying said adaptive control variable, and
    means responsive to deviations in said adaptive control level beyond a second range of values for modifying said fuel-type value.

2. The air/fuel control system set forth in claim 1 further comprising, in combination,
    means for generating an index value related to the rotational speed of said engine, and
    a memory lookup table for storing a plurality of variables including said adaptive control variable, said adaptive control variable being selected from said plurality of variables by an index value indicative of a relatively high engine speed such that said adaptive control variable is modified only when said engine is operating at said relatively high engine speed.

3. The air/fuel control system set forth in claim 2 wherein said means for storing a fuel-type value comprises, in combination,
    a sensor positioned to monitor the composition of the fuel being supplied to said engine to develop a fuel-type sensor output value, a second memory lookup table indexed by said fuel-type sensor output value for generating an uncorrected fuel-type value from which said corrected fuel-type value is derived.

4. The air/fuel control system set forth in claim 1 wherein said means for storing said adaptive control variable is a non-volatile memory capable of retaining said adaptive control variable when said engine is not is use.

* * * * *